United States Patent

Sugiyama et al.

Patent Number: 6,033,505
Date of Patent: Mar. 7, 2000

[54] METHOD FOR VIBRATION WELDING OF VEHICLE LAMP AND APPARATUS FOR THE SAME

[75] Inventors: Fujihiko Sugiyama; Shigeyuki Soga; Masahiko Nishizaki, all of Shizuoka, Japan

[73] Assignee: Koito Manufacturing Co., Ltd., Tokyo, Japan

[21] Appl. No.: 09/096,355

[22] Filed: Jun. 12, 1998

[30] Foreign Application Priority Data

Jun. 12, 1997 [JP] Japan .................................. 9-173265

[51] Int. Cl.[7] .................................................. B29C 65/06
[52] U.S. Cl. ......................... 156/73.5; 156/292; 156/580
[58] Field of Search ........................... 156/69, 73.5, 292, 156/580; 264/68

[56] References Cited

U.S. PATENT DOCUMENTS

| | | | |
|---|---|---|---|
| 4,411,726 | 10/1983 | Woerz et al. | 156/423 |
| 4,427,471 | 1/1984 | Chierici | 156/73.5 |
| 4,758,392 | 7/1988 | Collins et al. | 264/68 |
| 4,780,035 | 10/1988 | Shibayama et al. | 411/171 |
| 4,784,709 | 11/1988 | Unger et al. | 156/69 |
| 4,972,303 | 11/1990 | Machida et al. | 362/80 |
| 5,026,445 | 6/1991 | Mainolfi et al. | 156/73.5 |

*Primary Examiner*—James Sells
*Attorney, Agent, or Firm*—Sughrue, Mion, Zinn Macpeak & Seas, PLLC

[57] ABSTRACT

A method for vibration welding of lighting equipment for a vehicle, comprising the steps of: holding a lighting equipment body which is one synthetic resin-made component member of lighting equipment for a vehicle, in a body receiving jig; holding a front lens which is another synthetic resin-made component member thereof, in a lens receiving jig, the body receiving jig being provided with a stabilizing member whose hardness is higher than that of the lighting equipment body and which has a projection with a pointed tip; fixing the lighting equipment body in the body receiving jig and the front lens in the lens receiving jig and causing the stabilizing member to bite into a back surface of the lighting equipment body; and causing one of the body receiving jig and the lens receiving jig to vibrate so as to allow the lighting equipment body and the front lens to be vibration welded.

9 Claims, 5 Drawing Sheets

METHOD FOR VIBRATION WELDING OF VEHICLE LAMP AND APPARATUS FOR THE SAME

BACKGROUND OF INVENTION

The present invention relates to lighting equipment for a vehicle in which a portion to be welded in a lighting equipment body for forming lighting equipment for a vehicle, such as a marker lamp for an automobile, and a portion to be welded in such as a front lens for covering its opening are directly welded together by vibration which is caused in a welding portion between the two members. More particularly, the present invention relates to a method and apparatus for vibration welding of lighting equipment for a vehicle for effectively performing vibration welding by preventing resonance of the lighting equipment body on the fixed side during the vibration welding of the two members.

Hitherto, there has been proposed lighting equipment which is manufactured by a so-called vibration welding process in which a lighting equipment body 51 or the like formed of a thermoplastic synthetic resin and a front lens 52 or the like formed similarly of a thermoplastic synthetic resin are welded together by subjecting their portions to be welded to vibration welding. In the lighting equipment for a vehicle which is manufactured by this process, welding is effected as follows: Welding legs 54 of such as the front lens 52 are brought into contact with joining surfaces 53 of flange portions or the like of the lighting equipment body 51 of the equipment for a vehicle, the two members in a state of contact with each other are held under pressure, one member is caused to undergo vibration with respect to the other member to generate frictional heat, thereby allowing the welding legs 54 of such as the front lens 52 to be fitted to the fused joining surfaces 53 of such as the lighting equipment body 51 to be fitted. As shown in FIG. 9, the lighting equipment for a vehicle which is manufactured by this kind of vibration welding is manufactured by a vibration welding apparatus which operates as follows: The lighting equipment body 51 side with its joining surfaces 53 facing up is fitted in a body receiving jig 55, and the front lens 52 is fitted in a lens receiving jig 56 in a state in which distal ends of the welding legs 54 oppose the joining surfaces 53 of the aforementioned lighting equipment body 51. Subsequently, after, generally, both the body receiving jig 55 and the lighting equipment body 51 are raised, and the joining surfaces 53 are pressurized (in the direction of arrow Y) to abut against the welding legs 54 on the front lens 52 side fitted in the lens receiving jig 56, and the lens receiving jig 56 side, i.e., the front lens 52, is caused to undergo vibration (in the direction of arrow X) so as to generate frictional heat between the distal ends of the welding legs 54 and the joining surfaces 53, thereby partially fusing and joining the joining surfaces 53 and the welding legs 54.

However, with the above-described conventional vibration welding apparatus, if the front lens 52 side is vibrated, due to such as changes in various conditions, including the strength of pressure contact on the lighting equipment body 51 side and the relative size of the contact surfaces of the two members, the lighting equipment body 51, particularly the joining surfaces 53 which are portions of abutment with respect to the welding legs 54 of the front lens 52, resonate with the vibration of the front lens 52. Consequently, there is a problem in that frictional heat of a measure necessary for vibration welding is not generated, making welding impossible. As a measure against such a problem, there has been proposed a method in which turnup portions (not shown) which engage in grooves or the like formed in the body receiving jig 55 are fitted outside the joining surfaces 53 of the lighting equipment body 51 so as to prevent resonance. However, depending on the shape of the lighting equipment for a vehicle, particularly the lighting equipment body 51, there are cases where the turnup portion cannot be formed. In addition, in the case of the lighting equipment body 51 which is formed into a flat shape with a shallow bottom, since the portion fitted into the body receiving jig 55 is short, there has been a problem in that the lighting equipment body 51 moves in conjunction with the vibration of the front lens 52, and is disengaged from the body receiving jig 55, so that the welding operation cannot be performed.

SUMMARY OF INVENTION

The method and apparatus for vibration welding of lighting equipment for a vehicle in accordance with the present invention have been devised in view of the above-described problems, and an object of the present invention is to prevent the occurrence of resonance of the lighting equipment body on the fixed side at the time of vibration welding of members, such as between the joining surfaces of a thin lighting equipment body with a shallow bottom and the welding legs of the front lens, so as to generate sufficient frictional heat between the abutment portions of the two members and improve the vibration welding effect.

To attain the above object, in accordance with the present invention there is provided a method for vibration welding of lighting equipment for a vehicle, comprising the steps of: holding a lighting equipment body which is one synthetic resin-made component member of lighting equipment for a vehicle, in a body receiving jig; holding a front lens which is another synthetic resin-made component member thereof, in a lens receiving jig, the body receiving jig being provided with a stabilizing member whose hardness is higher than that of the lighting equipment body and which has a projection with a pointed tip; fixing the lighting equipment body in the body receiving jig and the front lens in the lens receiving jig and causing the stabilizing member to bite into a back surface of the lighting equipment body; and causing one of the body receiving jig and the lens receiving jig to vibrate so as to allow the lighting equipment body and the front lens to be vibration welded.

By virtue of the arrangement of the stabilizing member, the lighting equipment body side is prevented from resonating during the vibration of the front lens, and frictional heat can be sufficiently generated.

In addition, in accordance with the present invention there is provided an apparatus for vibration welding of a lighting equipment body which is one synthetic resin-made component member of a lighting equipment for a vehicle with a front lens which is another synthetic resin-made component member of the lighting equipment, the apparatus comprising: a body receiving jig for holding the lighting equipment body; a lens receiving jig for holding the front lens; and a stabilizing member provided with the body receiving jig, wherein a hardness of the stabilizing member is higher than that of the lighting equipment body and which has a projection.

The present invention is effective particularly in a case where the lighting equipment body which is held in the body receiving jig is formed with a shallow depth, and the stabilizing member can be located at a predetermined position on the back surface of the lighting equipment body.

Furthermore, the stabilizing member may be located at a position where a distal end thereof bites into a back surface of a joining surface of the lighting equipment body.

DETAILED DESCRIPTION OF PREFERRED EMBODIMENTS

Figure 1:
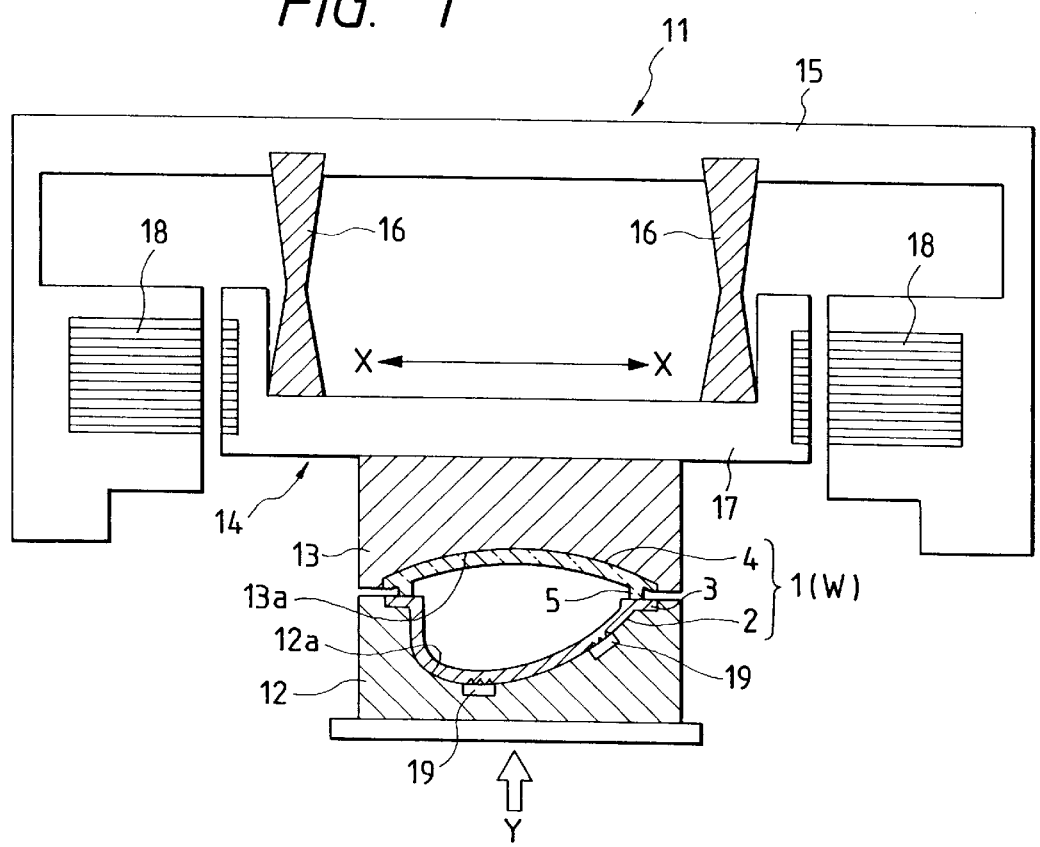
FIG. 1 is a vertical cross-sectional view illustrating a first embodiment of an apparatus for vibration welding of lighting equipment for a vehicle in accordance with the present invention.

Hereafter, a description will be given of a preferred embodiment of a method of vibration welding of lighting equipment for a vehicle in accordance with the present invention.

In the method of vibration welding of lighting equipment for a vehicle in accordance with the present invention, the following members are prepared: a body receiving jig 12 for holding a lighting equipment body 2 which is one synthetic resin-made component member of lighting equipment for a vehicle 1; and a lens receiving jig 13 for holding a front lens 4 which is another synthetic resin-made component member thereof. The body receiving jig 12 is provided with stabilizing members 19, 23, 25, and the like (which will be described later) whose hardness is higher than that of the lighting equipment body 2 and which have projections with pointed tips. The lighting equipment body 2 is fixed in the body receiving jig 12, and the front lens 4 is fixed in the lens receiving jig 13, and the stabilizing members 19, 23, 25, and the like are caused to bite into the back surface of the lighting equipment body 2. Subsequently, one of the body receiving jig 12 and the lens receiving jig 13 is caused to vibrate, thereby allowing the lighting equipment body 2 and the front lens 4 to be vibration welded.

In addition, the vibration welding apparatus used in the above-described method of vibration welding of lighting equipment for a vehicle is arranged as follows.

Figure 2:
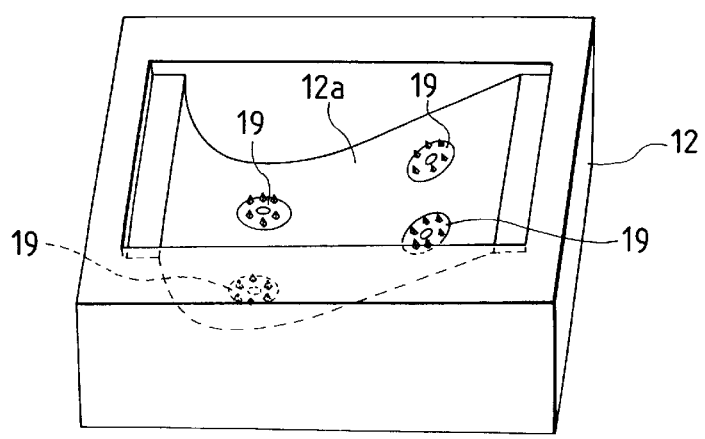
FIG. 2 is a perspective view illustrating the structure of a body receiving jig.
Figure 3A:
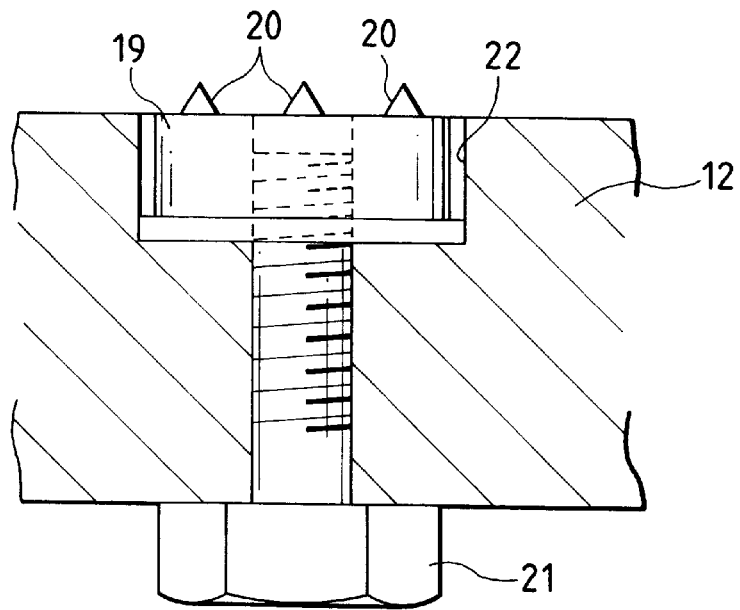
FIG. 3A is an enlarged vertical cross-sectional view of a body receiving jig, essential portions.
Figure 3B:
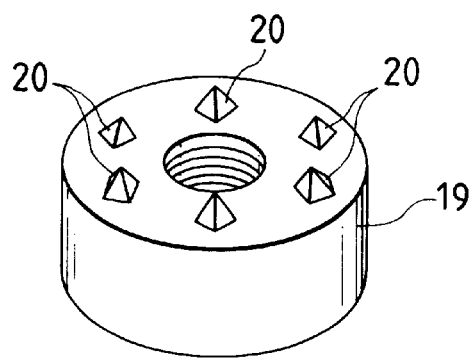
FIG. 3B is a perspective view thereof.
Figure 3C:
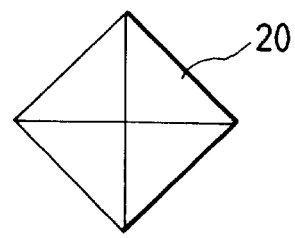
FIG. 3C is a plan view illustrating the shape of a projection formed on the stabilizing member.
Figure 3D:
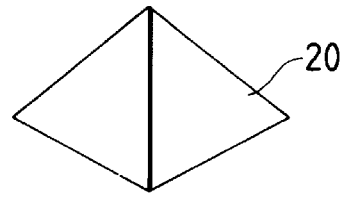
FIG. 3D is a perspective view thereof.

Namely, FIG. 1 is a vertical cross-sectional view illustrating an overall structure of the vibration welding apparatus in accordance with a preferred embodiment of the present invention. FIG. 2 is a perspective view illustrating the structure of the body receiving jig, and FIG. 3 shows a first example of the stabilizing member.

In the drawings, a vibration welding apparatus 11 operates such that frictional heat is generated in portions to be welded in a pair of workpieces W by making use of electromagnetic vibration, the material of the portions to be welded is fused by this frictional heat, and the workpieces W are integrally joined as they are subsequently allowed to cool and solidify. The vibration welding apparatus 11 is comprised of the body receiving jig 12 on the fixed side in which a recessed portion 12a is formed on its upper surface for fitting the lighting equipment body 2 constituting a part of the lighting equipment for a vehicle and serving as one workpiece W, the lens receiving jig 13 on the driving side in which a recessed portion 13a is formed on its lower surface for fitting the front lens 4 serving as another workpiece W; and a vibration generator 14 for electromagnetically vibrating this lens receiving jig 13.

In the aforementioned vibration generator 14, a vibrating member 17 is suspended from a lower surface of a top plate of a support 15 by means of a pair of resilient members 16 in such a manner as to be movable in a predetermined direction, i.e., in a left-and-right (horizontal) direction in the drawing. A pair of electromagnets 18 are disposed on both sides of the vibrating member 17 at left and right in such a manner as to oppose each other, and the lens receiving jig 13 is fixed to the underside of the vibrating member 17. Accordingly, as an electric current is allowed to alternately flow across the left and right electromagnets 18 so as to alternately attract the vibrating member 17 in the left-and-right (horizontal) direction and generate electromagnetic vibration (in the direction of arrow X). Thus, the lens receiving jig 13 fixed to the underside of the vibrating member 17 can be vibrated together with the vibrating member 17. In implementing the method of vibration welding in accordance with the present invention, the electromagnetic vibration of the vibrating member 17 is arranged to be generated as vibration at a frequency of, for example, 240 Hz or thereabout in the left-and-right direction. Incidentally, the method of generating this electromagnetic vibration is not limited to the above-described arrangement, and it goes without saying that similar electromagnetic vibration can be generated by modifying the arrangement as necessary.

In the lighting equipment for a vehicle 1 which is manufactured by the vibration welding apparatus for vibration welding the lighting equipment for a vehicle in accordance with the present invention, the distal ends of a thermoplastic synthetic resin-made member, i.e., welding legs 5 (seal leg portions or the like) formed at peripheral edge portions of the back surface of the front lens 4 or the like, are directly joined by vibration welding to the joining surfaces 3 (flanges or the like) which protrude laterally at peripheral edge portions of the opening of a similarly thermoplastic synthetic resin-made member, i.e., the lighting equipment body 2. In particular, the structure of the lighting equipment body 2 is formed of a thin type with a shallow bottom in correspondence with the structure on the vehicle body side. Accordingly, the structure of the lighting equipment for a vehicle 1 is such that the lighting equipment body 2 moves in conjunction with the vibration of the front lens 4, and is disengaged from the body receiving jig 12, making it impossible to perform the welding operation.

In the vibration welding apparatus for vibration welding the lighting equipment for a vehicle in accordance with the present invention, the stabilizing members 19 are formed so that when the lighting equipment body 2 of the lighting equipment for a vehicle 1 which is liable to resonate as described above is accommodated in the recessed portion 12a of the body receiving jig 12, the stabilizing members 19 slightly bite into the lower surface thereof, and prevent the horizontal slippage of the lower surface and the joining surfaces 3 of the lighting equipment body 2 in the recessed portion 12a. In this embodiment, an arrangement is provided such that one or more stabilizing members 19 are embedded in the inner surface of the recessed portion 12a formed on the upper surface of the body receiving jig 12 (see FIG. 2), and a plurality of pyramidal or conical protrusions 20 formed in upper portions thereof project from the inner surface of the body receiving jig 12 (see FIG. 3), and are capable of biting into the lower surface of the lighting equipment body 2 fitted thereon. In addition, this stabilizing member 19 in this embodiment is so structured as to be threadedly engaged with and fastened in a fixing hole 22 formed in the inner surface of the recessed portion 12a of the body receiving jig 12, by means of a bolt member 21 inserted from outside the body receiving jig 12. The number of the stabilizing members 19 may be increased or decreased as required, in the use of the stabilizing members 19.

Namely, the lighting equipment body 2 (one workpiece W) in a facing-up state is fitted in the body receiving jig 12 in which the stabilizing members 19 are embedded in the recessed portion 12a as described above. Then, ribs (not shown) formed at the peripheries of the joining surfaces 3 are fitted and secured in groove portions (not shown) on the lighting equipment body 12 side, as desired, and the front lens 4 (the other workpiece W) in a facing-down state, i.e., with the welding legs 5 facing down, is fixed in the recessed portion 13a formed on the lower surface of the lens receiving jig 13. Subsequently, the body receiving jig 12 is appropriately raised (in the direction of arrow Y) by a lifting machine (not shown) to clamp the workpieces W (the lighting equipment body 2 and the front lens 4) between the body receiving jig 12 and the lens receiving jig 13. The portions to be welded in the workpieces W are brought into pressure contact with each other, i.e., the distal ends of the welding legs 5 of the front lens 4 are brought into pressure contact with the upper surfaces of the joining surfaces 3 of the lighting equipment body 2, and electromagnetic vibration with an amplitude of, for example, 1 to 1.2 mm or thereabout is generated in a direction perpendicular to the pressurizing direction by the aforementioned vibration generator 14. Thus, the vibration welding operation is carried out by generating local frictional in the pressure contact portions.

Thus, with the vibration welding apparatus for vibration welding the lighting equipment for a vehicle in accordance with the present invention, the lighting equipment body 2 fitted in the recessed portion 12a of the body receiving jig 12 does not resonate with the vibration of the lens receiving jig side, i.e., the vibration of the front lens 4, and frictional heat can be effectively generated in the pressure contact portions.

Figure 4:
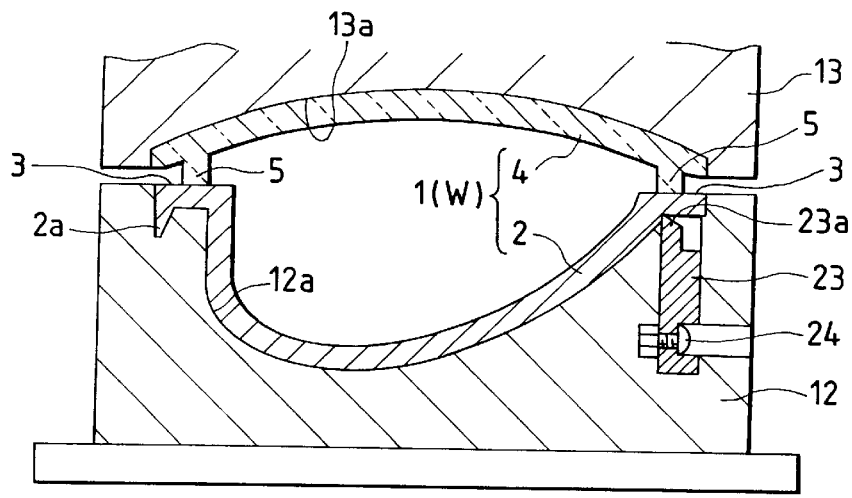
FIG. 4 is a vertical cross-sectional view illustrating a second embodiment of the apparatus for vibration welding of lighting equipment for a vehicle in accordance with the present invention.
Figure 5:
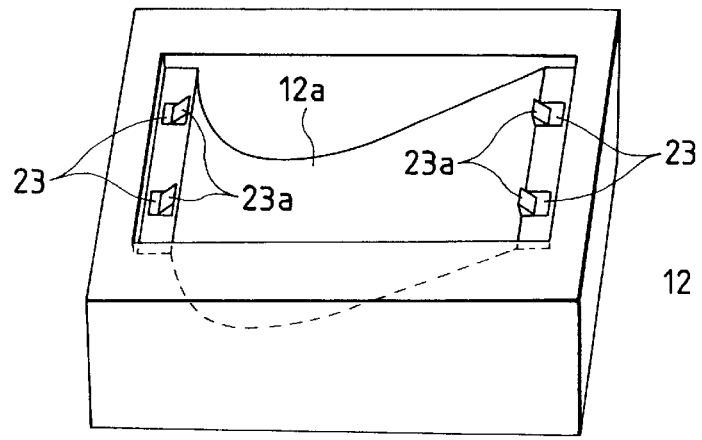
FIG. 5 is a perspective view illustrating the structure of a body receiving jig.
Figure 6:
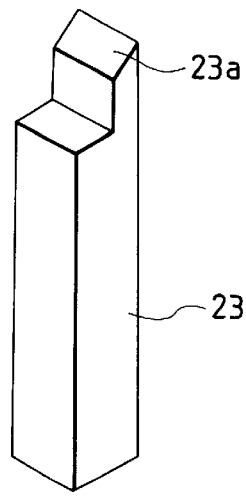
FIG. 6 is an enlarged perspective view illustrating the structure of a stabilizing member.

FIGS. 4 to 6 show a second embodiment of the vibration welding apparatus for vibration welding the lighting equipment for a vehicle in accordance with the present invention. In this embodiment, pillar stabilizing members 23 having acutely formed edges 23a at their upper ends are used, and the arrangement provided is such that the edges 23a are caused to bite into root portions of the lower surfaces of joining portions 3 of the lighting equipment body 2 fitted in the body receiving jig 12, so as to forcibly prevent the occurrence of resonance in the joining portions 3. The edges 23a are fitted in perpendicular to the vibrating direction of the lens receiving jig 13. As for these stabilizing members 23, it suffices if one or two stabilizing members 23 are provided on one joining portion 3 of the lighting equipment body where resonance is liable to occur. However, it goes without saying that the stabilizing members 23 may be provided on both sides corresponding to the two vibrating directions of the lens receiving jig 13. In addition, each of these stabilizing members 23 is installed in such a manner as to be accommodated in a hole (not shown) formed vertically in a base portion of the body receiving jig 12 for placing the joining portion 3 of the lighting equipment body 2 thereon, and the stabilizing member 23 is so structured that it is prevented from coming off by using a bolt member 24 or the like from a lateral direction of the body receiving jig 12. Further, a structure may be adopted in which the turnup portion 2a is formed on the opposite side of the lighting equipment body 2 to enhance the vibration isolating effect on that opposite side.

Figure 7:
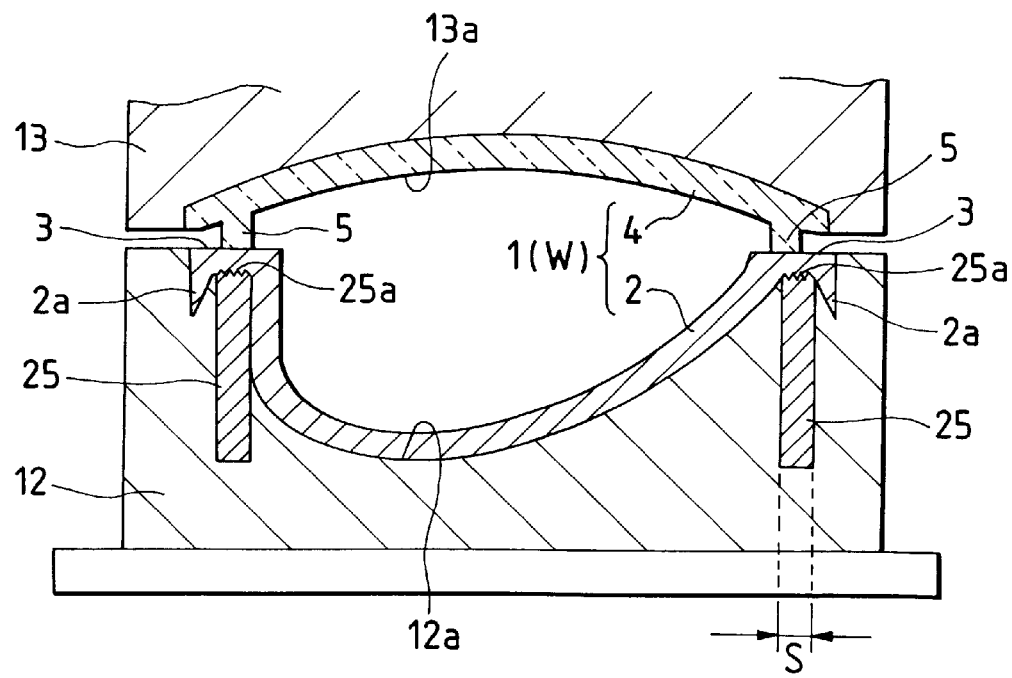
FIG. 7 is a vertical cross-sectional view illustrating a third embodiment of the apparatus for vibration welding of lighting equipment for a vehicle in accordance with the present invention.
Figure 8:
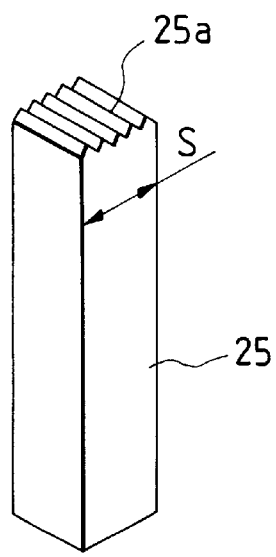
FIG. 8 is an enlarged perspective view illustrating the structure of a stabilizing member.
Figure 9:
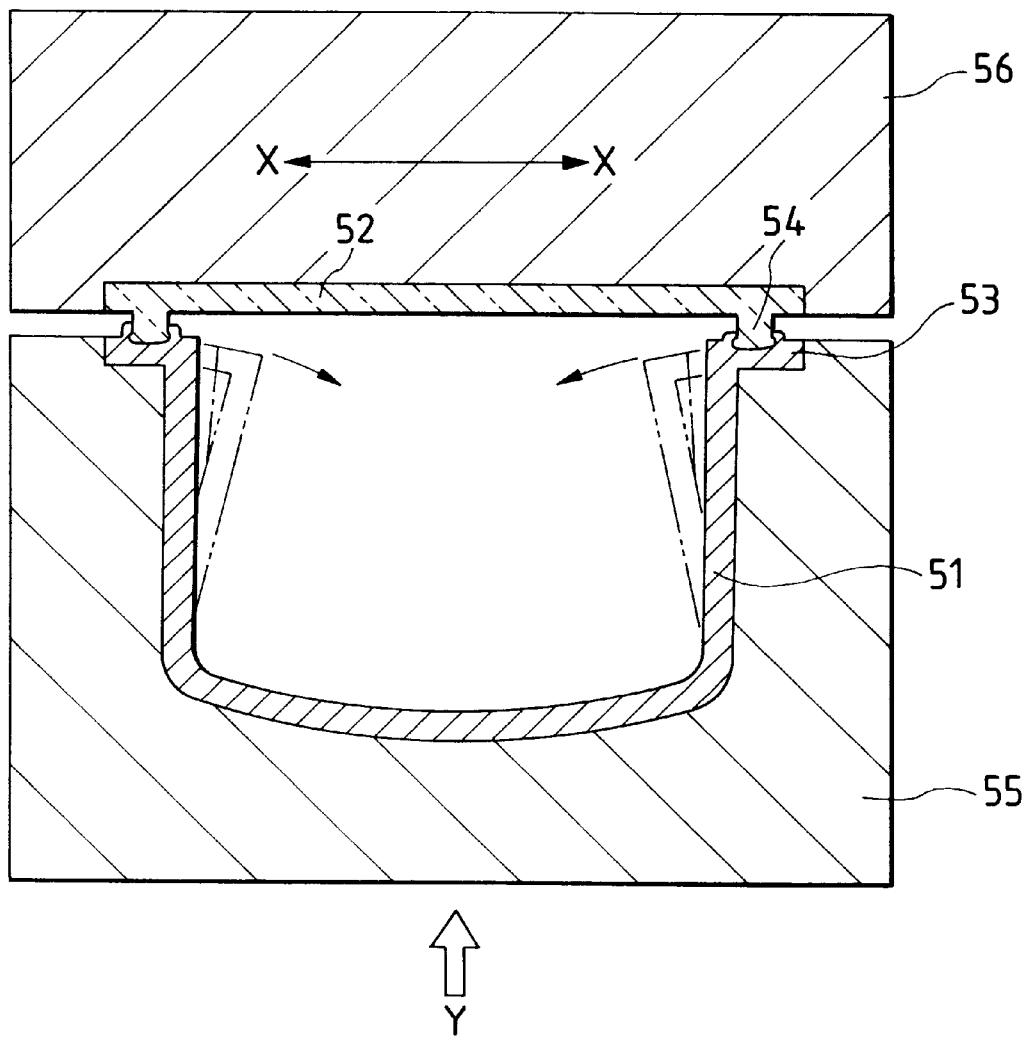
FIG. 9 is an explanatory diagram illustrating the structure of a conventional vibration welding apparatus.

FIGS. 7 and 8 show a third embodiment of the vibration welding apparatus for vibration welding the lighting equipment for a vehicle in accordance with the present invention. A description will be given of portions which differ from the above-described second embodiment.

In a stabilizing member 25 in this embodiment, instead of the edge 23a of the stabilizing member 23 in the above-described second embodiment, a knurled surface 25a for preventing slippage is formed on its upper surface. In a case where the turnup portion 2a is formed on the joining portion 3 of the lighting equipment body 2, the knurled surface 25a is preferably provided with a width which just fits in a width S extending from the position where the lower surface of the joining portion 3 begins to the position where it is turned up. Consequently, it becomes possible to improve the resonance preventing effect on the joining portion 3 side of the lighting equipment body 2.

Although the vibration welding apparatus for vibration welding the lighting equipment for a vehicle in accordance with the present invention has been described by citing an example in which the lighting equipment body 2 is used as the fixed side and the front lens 4 is used as the vibrating side, it goes without saying that the vibration welding apparatus can also be used as a vibration welding apparatus for vibration welding other members used in lighting equipment for a vehicle.

As described above, in accordance with the present invention, since the method and apparatus for vibration welding of lighting equipment for a vehicle in accordance with the present invention are arranged as described above, in the operation of vibration welding the front lens onto a lighting equipment body with a shallow bottom, the lighting equipment body on the fixed side is prevented from becoming removed from the body receiving jig by moving in conjunction with the vibration of the front lens or from resonating. Thus, frictional heat can be generated by an appropriate pressurizing force, the joining surfaces can be sufficiently fused, and the weldability with respect to the front lens can be improved. Moreover, since the structure provided is such that when the front lens vibrates, the stabilizing members bite into the back surface side of the lighting equipment body to fix the lighting equipment body within the body receiving jig, the present invention offers very large advantages in that no damage is caused to the obverse surface side of the completed lighting equipment for a vehicle and no problems occur in the product.

What is claimed is:

1. A method for vibration welding of lighting equipment for a vehicle, comprising the steps of:

holding a lighting equipment body which is one synthetic resin-made component member of lighting equipment for a vehicle, in a body receiving jig;

holding a front lens which is another synthetic resin-made component member thereof, in a lens receiving jig, the body receiving jig being provided with a stabilizing member whose hardness is higher than that of the lighting equipment body and which has a projection with a pointed tip;

fixing the lighting equipment body in the body receiving jig and the front lens in the lens receiving jig and causing the stabilizing member to bite into a back surface of the lighting equipment body; and causing one of the body receiving jig and the lens receiving jig to vibrate so as to allow the lighting equipment body and the front lens to be vibration welded.

2. An apparatus for vibration welding of a lighting equipment body which is one synthetic resin-made component member of a lighting equipment for a vehicle with a front lens which is another synthetic resin-made component member of the lighting equipment, the apparatus comprising:
  a body receiving jig for holding the lighting equipment body;
  a lens receiving jig for holding the front lens;
  a stabilizing member provided with said body receiving jig, wherein a hardness of the stabilizing member is higher than that of the lighting equipment body, and wherein the stabilizing member includes a projection.

3. The apparatus for vibration welding according to claim 2, wherein the lighting equipment body which is held in the body receiving jig is formed with a shallow depth, and the stabilizing member is located at a predetermined position on the back surface of the lighting equipment body.

4. The apparatus for vibration welding according to claim 2, wherein the stabilizing member is located at a position where a distal end thereof bites into a back surface of a joining surface of the lighting equipment body.

5. The apparatus for vibration welding according to claim 2, further comprising a bolt for fixing the stabilizing member to the body receiving jig.

6. The apparatus for vibration welding according to claim 2, wherein plural projections are provided with the stabilizing member.

7. The apparatus for vibration welding according to claim 2, wherein plural stabilizing members are fixed to the body receiving jig.

8. The apparatus for vibration welding according to claim 2, wherein the body receiving jig has a recessed portion in which the lighting equipment body is received.

9. The apparatus for vibration welding according to claim 2, further including a vibration member fixed to said lens receiving jig.

* * * * *